(12) United States Patent  
Hama

(10) Patent No.: US 7,800,643 B2
(45) Date of Patent: Sep. 21, 2010

(54) IMAGE OBTAINING APPARATUS

(75) Inventor: Soichi Hama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1394 days.

(21) Appl. No.: 11/235,332

(22) Filed: Sep. 27, 2005

(65) Prior Publication Data

US 2006/0290781 A1    Dec. 28, 2006

(30) Foreign Application Priority Data

Jun. 28, 2005   (JP) .............................. 2005-188330

(51) Int. Cl.
    *H04N 7/18*    (2006.01)
(52) U.S. Cl. ....................... 348/135; 348/136
(58) Field of Classification Search .......... 348/130–160
    See application file for complete search history.

(56) References Cited

U.S. PATENT DOCUMENTS

| 4,473,285 A | | 9/1984 | Winter | |
|---|---|---|---|---|
| 5,151,821 A | * | 9/1992 | Marks | 359/462 |
| 6,219,093 B1 | * | 4/2001 | Perry | 348/135 |
| 6,509,973 B2 | * | 1/2003 | Kiyoi et al. | 356/606 |
| 6,606,458 B2 | * | 8/2003 | Umeda et al. | 396/110 |
| 6,697,147 B2 | | 2/2004 | Ko et al. | |
| 7,095,886 B2 | * | 8/2006 | Massen | 382/154 |
| 2004/0001197 A1 | | 1/2004 | Ko et al. | |

FOREIGN PATENT DOCUMENTS

| CN | 1465988 A | 1/2004 |
|---|---|---|
| EP | 0974811 A1 | 1/2000 |
| JP | 57-189005 A | 11/1982 |
| JP | 62-190411 | 8/1987 |
| JP | 63-314403 A | 12/1988 |
| JP | 2-171608 A | 7/1990 |
| JP | 7-234116 A | 9/1995 |
| JP | 7-264577 | 10/1995 |
| JP | 8-210812 | 8/1996 |
| JP | 2000-230807 | 8/2000 |
| JP | 2004-37440 A | 2/2004 |

(Continued)

OTHER PUBLICATIONS

S. Qian, "New System for the on-line measurement of diameters of cable core", Optical technology No. 4, China Academic Journal, Electronic Publishing House, Jul. 1998, pp. 28-29.

(Continued)

*Primary Examiner*—Andy S Rao
(74) *Attorney, Agent, or Firm*—Fujitsu Patent Center

(57) ABSTRACT

The image obtaining apparatus realizes a function of detecting the distance, tilt, and/or attitude of an object, irrespective of the distance between the image obtaining apparatus and the object, while reducing the size and the cost of the apparatus. The apparatus includes: an image obtaining camera which obtains an image of an object; a light projecting unit which projects each spotlight parallel or approximately parallel to the optical axis of the image obtaining camera onto the object; a detecting unit which detects the distance between the image obtaining camera and the object based on the position of the spotlight, projected by the light projecting unit, on the object image obtained by the image obtaining camera.

19 Claims, 14 Drawing Sheets

FOREIGN PATENT DOCUMENTS

| | | |
|---|---|---|
| JP | 2005-6272 | 1/2005 |
| KR | 1983-10399 A | 12/1983 |

OTHER PUBLICATIONS

First Office Action issued in corresponding Chinese patent application No. 2005101188358.

Japanese Office Action dated May 27, 2008 (mailing date), issued in corresponding Japanese Patent Application No. 2005-188330.

Office Action dated Nov. 15, 2006, issued in corresponding Korean patent application No. 2005-0101384.

"EESR", Mailed Aug. 3, 2009 from EU Patent Office for corresponding EU Patent App. No. 05255886.3.

\* cited by examiner

IMAGE OBTAINING APPARATUS

BACKGROUND OF THE INVENTION

1) Field of the Invention

The present invention relates to an image obtaining apparatus which obtains picture images of an object without direct contact therewith. The invention relates particularly to an image obtaining apparatus which has functions of detecting the position (the distance from the image obtaining apparatus), the tilt, and the attitude of the object.

2) Description of the Related Art

There are conventional image obtaining apparatuses which obtain images of an object whose image is to be obtained (hereinafter will be simply called the "object") without direct contact therewith, while detecting the position, the tilt, or the attitude of the object.

Such an image obtaining apparatus has a distance sensor 100 using the optical triangulation technique as shown in FIG. 13.

In the distance sensor 100 of FIG. 13, a light source 101, which projects laser light, projects a spotlight (laser light) to a measurement object via a lens 102, and an optical position detecting sensor (hereinafter will be simply called the "position sensor") 103, such as a PSD (Position Sensitive Detector), detects light reflected from the measurement object. In this instance, there is a lens 104 interposed between the position sensor 103 and the measurement object.

In this distance sensor 100, the reflection angle of the reflected light depends on the distances from the distance sensor 100 to the measurement objects A and B. Thus, utilizing the fact that light spot positions A' and B' depend on the distances from the distance sensor 100 to the measurement objects A and B, the distances from the distance sensor 100 to the measurement objects A and B are measured based on the light spot positions A' and B'.

Further, as an apparatus for measuring the distance to the measurement object, the following patent document 1, for example, discloses a distance measuring device 100a as shown in FIG. 14(a) and FIG. 14(b).

The distance measuring device 100a of FIG. 14(a) and FIG. 14(b) includes: a CCD camera 110 with a horizontal angle of view α (see FIG. 14(a)) and a vertical angle of view β (see FIG. 14(b)); a pair of laser light sources 111a and 111a, provided on each side of the CCD camera, having a radiation angle θ for emitting radial right-angle parallel laser light 111 and 111; and an operation unit 112. Here, the CCD camera 110 has a fixed focus lens 110a and a CCD (Charged Coupled Device) 111b, which is an optical/electrical converter.

As shown in FIG. 15(a) and FIG. 15(b), in the distance measuring device 100a, the operation unit 112 calculates e.g., the distance of a measurement object C based on the positions of the bright lines (bright lines due to light projection from laser sources 111a and 111a) 121 and 122 on the measurement object C in a picture image 120 which is obtained by the CCD camera 110 with linear light projected on the measurement object C from the laser light sources 111a and 111a. Here, detection lines 123 through 125 in FIG. 15(b) are for detecting the positions of the bright lines 121 and 122.

The distance sensor 100 of FIG. 13 only has a function of obtaining the distance of the measurement object. Thus, the above-described conventional image obtaining apparatus requires two or more distance sensors 100 to detect the tilt (two-dimensional information) of the object. In addition, the apparatus requires three or more distance sensors 100 to detect the attitude (three-dimensional information) of the object. In such cases, the size of the image obtaining apparatus is increased, and cost is also increased.

In addition, the light sources of such distance sensors 100 are not as reasonable as LED (Light Emitting Diode), and expensive laser light sources are used therein. This also increases the cost of the apparatus. Further, the position sensors 103 is in need of detecting the light spot positions of the reflected light, which also increase the size of the apparatus.

Furthermore, the above-described distance measuring device 100a of FIG. 14(a) and FIG. 14(b) also uses a laser light source as a light source for projecting linear light, so that cost is increased.

Here, if the distance measuring device 100a uses an inexpensive LED as a light source 111a, both ends of the bright lines in the image 120 obtained by the CCD camera 110 become dim, or they are blurred and widened, so that sufficient performance cannot be expected.

Further, in the distance measuring device 100a, each light source 111a projects linear light, having a specific spread (that is, radiation angle θ) in one direction, to the measurement object C, and the lengths of the bright lines 121 and 122 in a screen image 120 obtained by the CCD camera 110 are always the same irrespective of the distance of the measurement object C.

Accordingly, as shown in FIG. 16(a), for example, if the measurement object goes away, the bright lines 121 and 122 lie off the measurement object C, as shown in FIG. 16(b), and as a result, an expected detection becomes unavailable.

(Patent Document 1) Japanese Patent Application Publication No. 2000-230807

SUMMARY OF THE INVENTION

With the foregoing problems in view, it is an object of the present invention to provide an image obtaining apparatus with a function of detecting the distance, tilt, and/or attitude of an object, irrespective of the distance between the image obtaining apparatus and the object, while reducing the size and the cost of the apparatus.

In order to accomplish the above object, according to the present invention, there is provided an image obtaining apparatus, comprising: an image obtaining camera which obtains an image of an object; a light projecting unit which projects each spotlight parallel or approximately parallel to the optical axis of the image obtaining camera onto the object; and a detecting unit which detects the distance between the image obtaining camera and the object based on the position of the spotlight, projected by the light projecting unit, on the object image obtained by the image obtaining camera.

As a preferred feature, the light projecting unit projects three or more spotlights, and the detecting unit detects attitude information of the object relative to the optical axis of the image obtaining camera based on the positions of the three or more spotlights, projected by the light projecting unit, on the object image obtained by the image obtaining camera. In this instance, the light projecting unit preferably projects the three or more spotlights in such a manner that in the obtained image, directions from a reference point of the image to the positions of the three or more spotlights are different from one another.

As another preferred feature, the light projecting unit projects the three or more spotlights in such a manner that in the obtained image, each area irradiated with a spotlight from the light projecting unit, which area is recognizable to the detecting unit, does not interfere with its adjacent area irradiated with another spotlight.

As yet another preferred feature, the detecting unit extracts a spot position from an area irradiated with the each spotlight on the object image, and performs the above detection based on the distance between the extracted spot position and the center point of the obtained image. In this instance, the detecting unit preferably extracts the center point or the barycenter point of the irradiated area as the spot position.

As a further preferred feature, the detecting unit searches for the irradiated area, starting from the center point of the obtained image, toward a specified direction, and extracts the spot position from an area that is initially found out as an irradiated area.

As a still further preferred feature, the image obtaining apparatus further comprises a control unit which controls image obtaining by the image obtaining camera and spotlight projection by the light projecting unit. The control unit controls the image obtaining camera to obtain a first image of the object under a condition where no spotlight from the light projecting unit is projected thereon, and to obtain a second image of the object under a condition where each spotlight from the light projecting unit is projected thereon, and the detecting unit performs the above detection based on an image obtained by removing bright areas in the first image from the second image.

As a generic feature, there is provided an image obtaining apparatus, comprising: an image obtaining camera which obtains an image of an object; a light projecting unit which projects a plurality of spotlights parallel or approximately parallel to the optical axis of the image obtaining camera onto the object; and a detecting unit which detects the tilt of the object relative to the optical axis of the image obtaining camera based on the positions of the plurality of spotlights on the object image obtained by the image obtaining camera.

As another generic feature, there is provided an image obtaining apparatus, comprising: an image obtaining camera which obtains an image of an object; a light projecting unit which projects a plurality of spotlights parallel or approximately parallel to the optical axis of the image obtaining camera onto the object; and a detecting unit which detects (i) the distance between the image obtaining camera and the object and (ii) the tilt of the object relative to the optical axis of the image obtaining camera, based on the positions of the plurality of spotlights, projected by the light projecting unit, on the object image obtained by the image obtaining camera.

As described so far, according to the present invention, on the basis of the positions of the spotlights projected by the light projecting unit on the image of the object obtained by the image obtaining camera, the detecting unit detects (i) the distance between the image obtaining camera and the object and (ii) the tilt of the object from the optical axis of the image obtaining camera 10. Hence, it is not necessary that a sensor (position sensor, etc.) for detecting the distance between the image obtaining camera and the object be separately provided, so that the whole apparatus is downsized and cost reduction is realized.

When adding a function of detecting the distance and the tilt of an object to an existing apparatus having an image obtaining camera, only a light projecting unit should be added as hardware, so that the present image obtaining apparatus is realized as a downsized apparatus with reduced cost.

Further, in the present invention, spotlights projected by the light projecting units are parallel or approximately parallel to the optical axis of the image obtaining camera. Thus, as long as the object moves along a direction parallel to the optical axis of the image obtaining camera, the positions of bright areas lighted by spotlights on the object are the same among the images obtained by the image obtaining camera.

Accordingly, in the present image obtaining apparatus, it is possible for the detecting unit to reliably detect the distance and the tilt of the object, irrespective of the distance of the object from the image obtaining camera.

Other objects and further features of the present invention will be apparent from the following detailed description when read in conjunction with the accompanying drawings.

BRIEF DESCRIPTION OF THE DRAWINGS

FIG. 5($b$) shows diagrams each showing a picture image obtained by an image obtaining camera under a condition of FIG. 5($a$);

FIG. 9($a$) is a diagram schematically showing an image obtaining state where an image obtaining camera obtains an image of an object; FIG. 9($b$) is a diagram showing an image obtained by the image obtaining camera under the state illustrated by FIG. 9($a$);

FIG. 14($a$) is a top view of the apparatus; FIG. 14($b$) is a side view of the apparatus;

FIG. 15($a$) and FIG. 15($b$) are diagrams for describing a method for calculating the distance between the conventional image obtaining apparatus of FIG. 14($a$) and FIG. 14($b$) and an object; FIG. 16(a) is a diagram showing an example of an image obtaining state of the object; FIG. 16(b) is a diagram showing a picture image obtained by a CCD camera under a state which is illustrated in FIG. 16(a).

DESCRIPTION OF THE PREFERRED EMBODIMENT(S)

One preferred embodiment of the present invention will now be described with reference to the relevant accompanying drawings.

(1) One Preferred Embodiment

Figure 1:
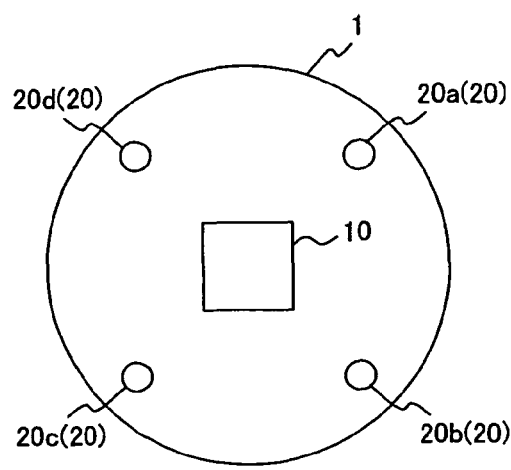
FIG. 1 is a front view of an image obtaining apparatus according to one preferred embodiment of the present invention.
Figure 2:
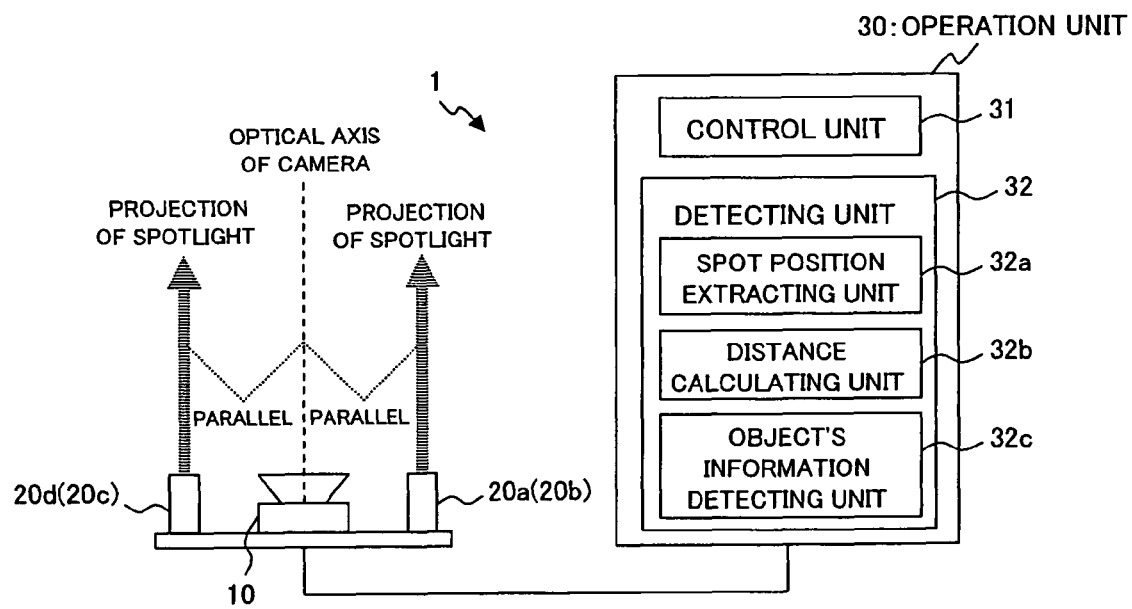
FIG. 2 is a diagram showing a construction of the image obtaining apparatus of the present embodiment.

A description will be made hereinbelow of an image obtaining apparatus according to one preferred embodiment of the present invention. FIG. 1 is a front view of an image obtaining apparatus of one preferred embodiment of the present invention; FIG. 2 is a diagram showing a construction of the image obtaining apparatus of the present embodiment.

As shown in FIG. 1 and FIG. 2, the image obtaining apparatus 1 has an image obtaining camera 10, more than one (here four) light projecting unit 20a through 20d, and an operation unit 30.

The image obtaining camera 10 obtains an image of an object which is present in front the image obtaining camera 10.

All the light projecting units 20a through 20d (will be simply denoted by reference character "20", when no special distinction is made thereamong) are the same in construction, and, as shown in FIG. 2, each of the light projecting units 20a through 20d projects a spotlight, parallel or approximately parallel to the optical axis of the image obtaining camera, onto an object whose image is to be obtained. Here, it is preferable that the light projected from the projecting unit 20 be infrared light. With this arrangement, when an image is obtained from a human body part or under a condition where other people are present, the projection of light by the projecting unit 20 is carried out without being noticed by such people.

Figure 3:
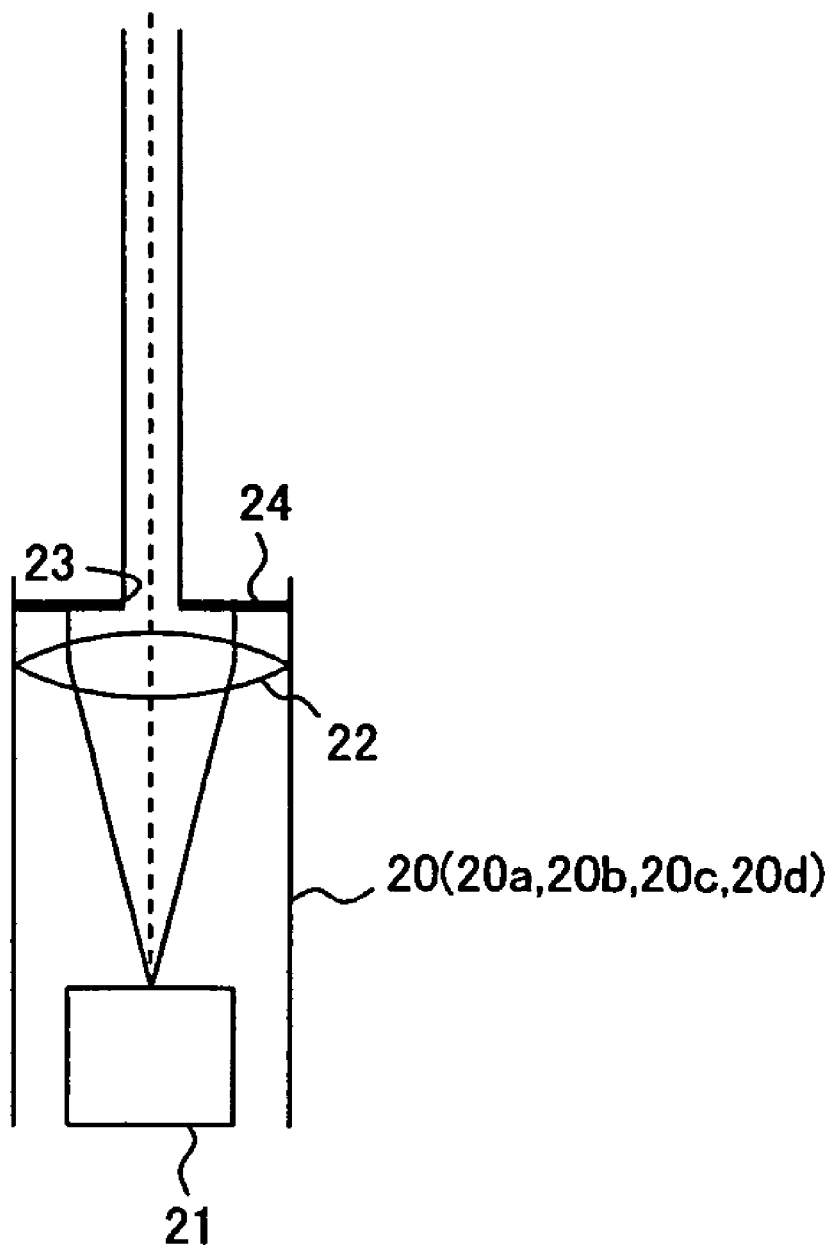
FIG. 3 is a diagram for describing a construction of a light projecting unit of the image obtaining apparatus of the present embodiment.

As shown in FIG. 3, each projecting unit 20 includes: a light source 21; a lens (for example, collimator lens) 22 which transforms light emitted by the light source 21 into parallel light; and an adjusting unit 24 having an aperture 23 for adjusting (here reducing) the spot diameter of the light (spotlight) projected via the lens 22.

Here, it is preferable that the light source (light emitting device) 21 be an LED (Light Emitting Diode).

Figure 4:
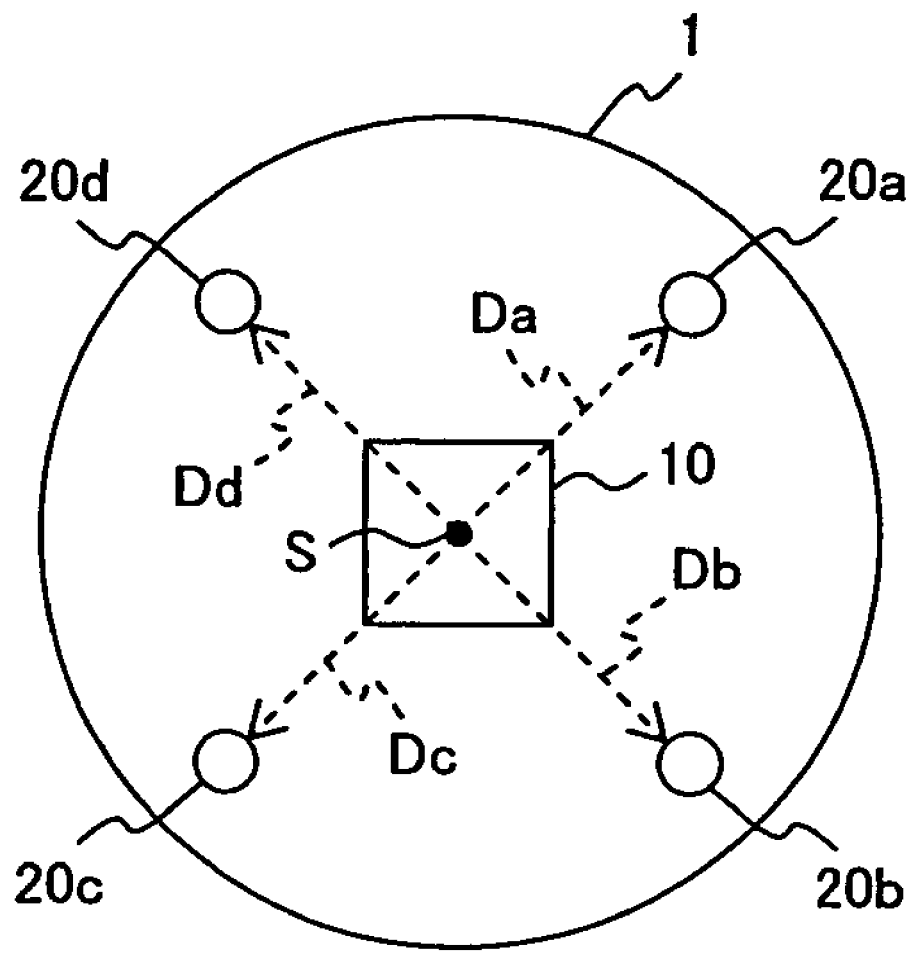
FIG. 4 is a diagram for describing placements of light projecting units of the image obtaining apparatus of the present embodiment.

As shown in FIG. 4, the light projecting units 20a through 20d are arranged relative to the image obtaining camera 10 in such a manner that directions (dotted lines in FIG. 4) Da through Dd from a reference point (here, the center point) of the image obtaining camera 10 toward the light projecting units 20a through 20d are different from one another. That is, according to the image obtaining apparatus 1, in a picture image obtained by the image obtaining camera 10, spotlights from the light projecting units 20a through 20d are projected in such a manner that directions from a reference point (here, the center point) of the picture image obtained by the image obtaining camera 10 toward the positions of the projected spotlights are different from one another.

In the present image obtaining apparatus 1, each of the four areas that are obtained by dividing a picture image, obtained by the image obtaining camera 10, into horizontally and vertically two, contains one bright area (an area to which a spotlight is projected; will be hereinafter also called the "spotlight") lighted by a spotlight projected by each projecting unit 20.

The projecting units 20 are arranged in such a manner that in the obtained picture image, a bright area irradiated with a spotlight from a light projecting unit 20 does not interfere with its adjacent bright areas irradiated with other spotlights. That is, according to the image obtaining apparatus 1, in the obtained image, spotlights are projected so that each bright area lighted by a spotlight does not interfere with its adjacent bright areas lighted by other spotlights.

Therefore, in the present image obtaining apparatus 1, it is possible for the spot position extracting unit 32a (will be described later) to reliably extract spot positions from a picture image obtained.

Figure 5A:
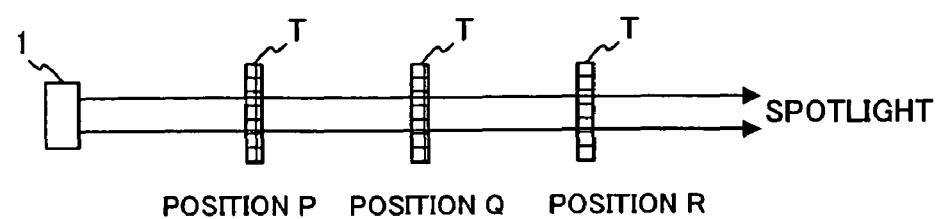
FIG. 5($a$) is a diagram schematically showing an image obtaining state where images of objects are obtained according to the present embodiment.
Figure 5B:
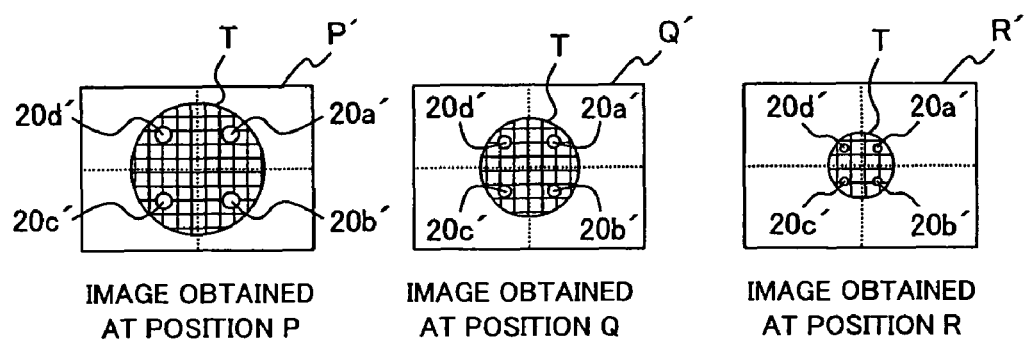

As shown in FIG. 5(a), in the present image obtaining apparatus 1, with a cylindrical object T moved along a direction parallel to the optical axis of the image obtaining camera 10, to positions P, Q, and R, the image obtaining camera 10 obtains picture images of the object T at positions P, Q, and R. As a result, picture images P', Q', and R' are obtained. Here, in FIG. 5(b), picture image P' is a picture image obtained when the object T is positioned at position P; picture image Q' is a picture image obtained when the object T is positioned at position Q; picture image R' is a picture image obtained when the object T is positioned at position R. In addition, reference character "20a'" in picture images P', Q', and R' designates a bright area lighted by a spotlight projected by the light projecting unit 20b; reference character "20c'" designates a bright area lighted by a spotlight projected by the light projecting unit 20c; reference character "20d'" designates a bright area lighted by a spotlight projected by the light projecting unit 20d;

As shown in FIG. 5(b), in the present image obtaining apparatus 1, a spotlight projected by the light projecting unit 20 is parallel or approximately parallel to the optical axis of the image obtaining camera 10, and the spotlights projected by the light projecting units 20 are parallel to one another. Therefore, the positions of spotlights on the object T are the same among the picture images P', Q', and R' obtained by the image obtaining camera 10 (that is, the positions of the bright areas 20a' through 20d' on the object T are the same among the picture images P', Q', and R'). The size of the object T changes according to the distance from the image obtaining camera 10 to the object T. With such change in size of the object T, the relative distances of spotlights are changed. That is, in the images P', Q', and R' of FIG. 5(b), the distances among the spotlights on the object T are large in the image P', and the distances are small in the image R'.

Accordingly, in the present image obtaining apparatus 1, there are always bright areas lighted by spotlights by the light projecting unit 20 on the object in the picture image obtained by the image obtaining camera 10, irrespective of the distance from the image obtaining camera 10 to the object. It is thus possible for a spot position extracting unit 32a (will be described later) to reliably extract spot positions from the bright areas.

The operation unit 30 is formed by, for example, a CPU (Central Processing Unit), and includes a control unit 31 and a detecting unit 32, as shown in FIG. 2.

The control unit 31 controls an image obtaining operation of the image obtaining camera 10 and spotlight projection of the light projecting unit 20. Here, the control unit 31 controls the image obtaining camera 10 and the light projecting units 20 so that image obtaining by the image obtaining camera 10 is performed in synchronism with spotlight projection by the light projecting units 20. In this manner, the control unit 31 makes the image obtaining camera 10 obtain an image of an object to which a spotlight is projected.

The detecting unit 32, including a spot position extracting unit 32a, a distance calculating unit 32b, and an object's information detecting unit 32c, detects (i) the distance between the image obtaining camera 10 and an object and (ii) the tilt (two-dimensional information) of the object relative to the optical axis of the image obtaining camera 10, based on the positions of spotlights projected by the light projecting unit 20 on the object in an image obtained by the image obtaining camera 10. Alternatively, the detecting unit 32 detects (i) the above distance and (ii) the attitude (three-dimensional information) of the object relative to the optical axis of the image obtaining camera 10, based on the above positions of the spotlights.

The spot position extracting unit 32a identifies bright areas, lighted by spotlights that are projected by the light projecting units 20, on the object in an image obtained by the image obtaining camera 10 (hereinafter will be simply called the "image"), and extracts a spot position from the identified bright area.

The spot position is a reference point in a bright area for use in identifying the position of the bright area lighted by a spotlight. Here, the spot position extracting unit 32a selects the center point or the barycenter point of the bright area as a spot position.

In addition, the spot position extracting unit 32a searches for bright areas corresponding in number to the number of light projecting units 20.

Figure 6:
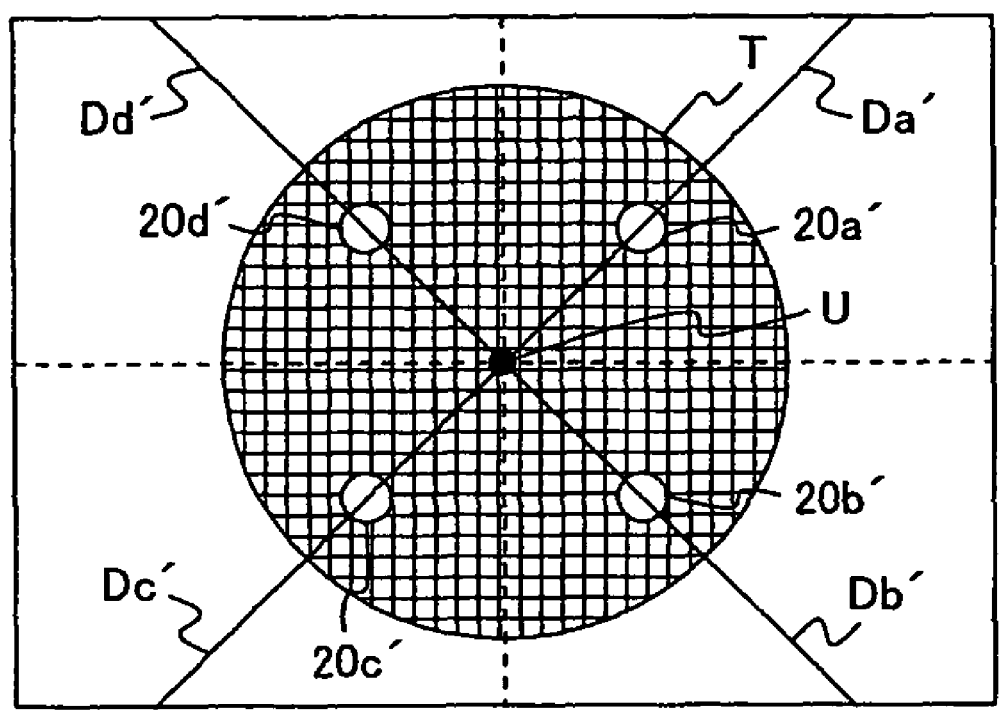
FIG. 6 is a diagram showing an object image obtained by an image obtaining camera of the image obtaining apparatus according to the present embodiment.

As shown in FIG. 6, the spot position extracting unit 32a searches for bright areas along straight lines Da' through Dd', which correspond to directions Da through Dd, respectively, in FIG. 4, with the center point U of the image as a start point. As already described with reference to FIG. 5(a) and FIG. 5(b), in the image obtaining apparatus 1, as long as the object moves along a direction parallel to the optical axis of the image obtaining camera 10, the positions of bright areas lighted by spotlights on the object are the same among the obtained images. Accordingly, the present technique utilizes the characteristic that bright areas lighted by spotlights of the light projecting units 20 in the image are always present along the straight lines corresponding to directions Da through Dd in FIG. 4.

More specifically, the spot position extracting unit 32a searches for bright areas, starting from the center point U of the image, toward the directions in which the light projecting units 20 are arranged in the image obtaining apparatus 1, that is, the search is performed toward specified directions in which spotlights are projected on the object in the image.

According to the spot position extracting unit 32a, all the areas on the image need not be searched, and the search should be performed only on the lines on which the light projecting units 20 are placed, to identify bright areas, so that identification of such bright areas is considerably efficiently performed.

Further, the spot position extracting unit 32a performs the above-described searching, and identifies bright areas initially found out on the above-mentioned lines as a bright area lighted by spotlights projected by the light projecting units 20.

Figure 7:
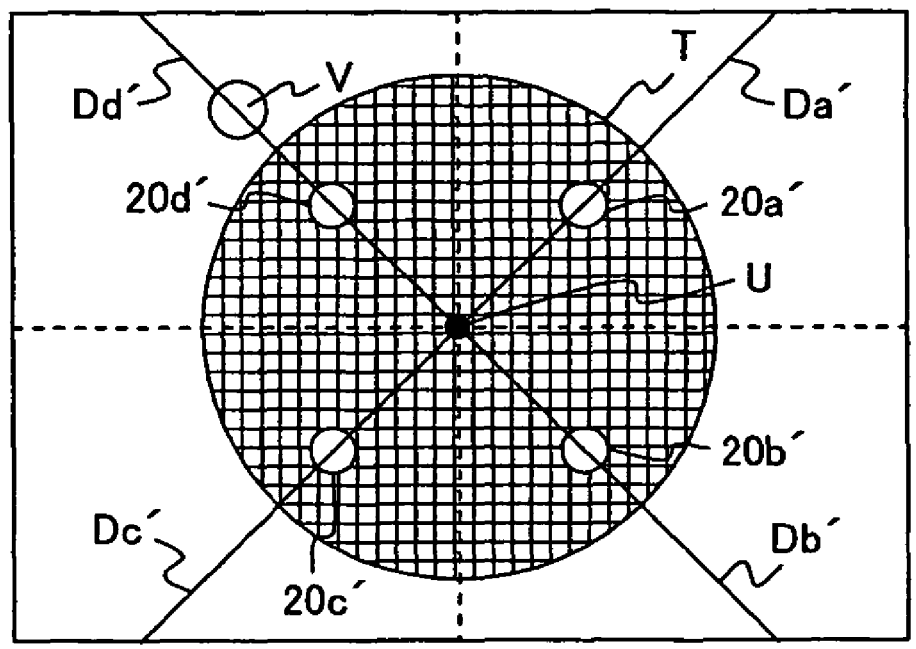
FIG. 7 is a diagram showing an object image obtained by an image obtaining camera of the image obtaining apparatus according to the present embodiment.

Here, as shown in FIG. 7, it is assumed that there is another bright area V than bright areas Da through Dd that are lighted by spotlights in the image, since light other than spotlights from the light projecting unit 20 is present at the time the image obtaining camera 10 obtains the picture image of the object T. Even in such a case, since the spot position extracting unit 32a starts searching for bright areas with the center point U as a start point, bright areas that are initially found out on the lines 20a' through 20d' are always bright areas Da through Dd lighted by spotlights on the object T. Accordingly, the spot position extracting unit 32a is capable of reliably searching for bright areas Da through Dd.

After that, the spot position extracting unit 32a extracts the center points or the barycenter points (here, center points) of the found-out (identified) bright areas as spot positions.

Figure 8:
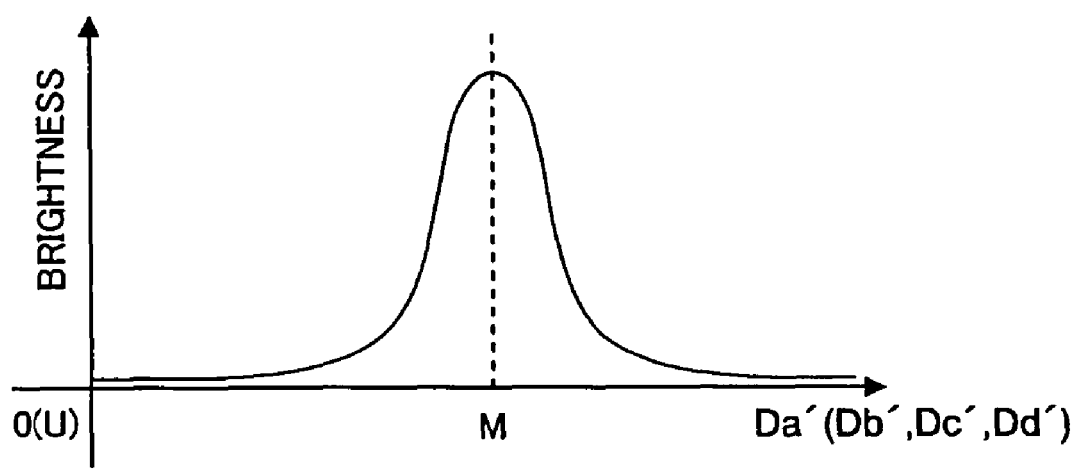
FIG. 8 is a graph for describing a method for extracting a spot position by a spot position extracting unit of a detecting unit of the image obtaining apparatus according to the present embodiment.

In the image obtaining apparatus 1, the spot position extracting unit 32a searches along the straight lines Da' through Dd'. Thus, as shown in FIG. 8, bright areas (Gaussian curve distribution) with high brightness are found out on the straight lines Da' through Dd', and the spot position extracting unit 32a extracts the center point M of each of the found-out bright areas as a spot position.

The distance calculating unit 32b of FIG. 2 calculates the distance between the image obtaining camera 10 and the object based on the distance between the spot positions extracted by the spot position extracting unit 32a and the center point of the picture image.

More specifically, the distance calculating unit 32b calculates the distance between each spot position, extracted from the bright areas lighted by the light projecting units 20, and the center of the picture image. Thus, in the present image obtaining apparatus 1, a total of four distances are calculated for one object.

Here, referring to FIG. 9(a) and FIG. 9(b), a description will be made of a method for distance calculation performed by the distance calculating unit 32b. Note that in FIG. 9(a) reference character "E" denotes a bright area on the object T, the area being lighted by a spotlight projected by the light projecting unit 20. FIG. 9(b) shows an image obtained by the image obtaining camera 10 under the condition illustrated in FIG. 9(a).

According to the image obtaining apparatus 1, in an ideal application, the optical axis of the image obtaining camera 10 is parallel to the axis of the spotlight projected by the light projecting unit 20. However, making the two axes exactly parallel necessitates application (assembly) with very high precision, and it is thus difficult in practical cases. Thus, in a practical image obtaining apparatus 1, it is conceivable that there is a case where the axis of the spotlight projected by the light projecting unit 20 is not completely parallel to the axis of the image obtaining camera 10 and the axis is slightly tilted.

Figure 9A:
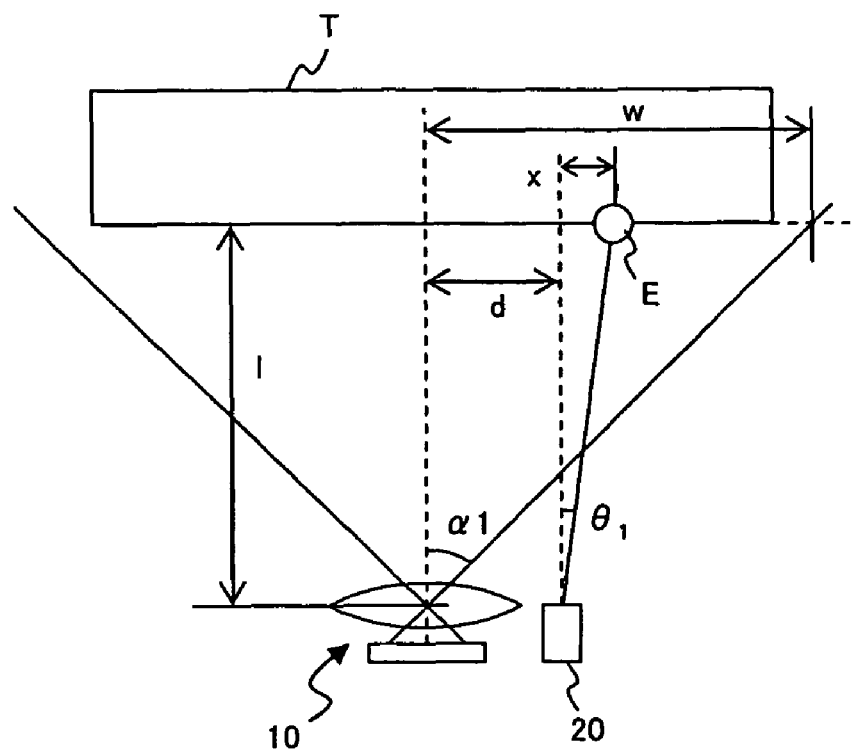
FIG. 9($a$) and FIG. 9($b$) are diagrams for describing a method for calculating the distance from an image obtaining camera to an object, which distance calculation is performed by a distance calculating unit of a detecting unit of an image obtaining apparatus of the present embodiment.
Figure 9B:
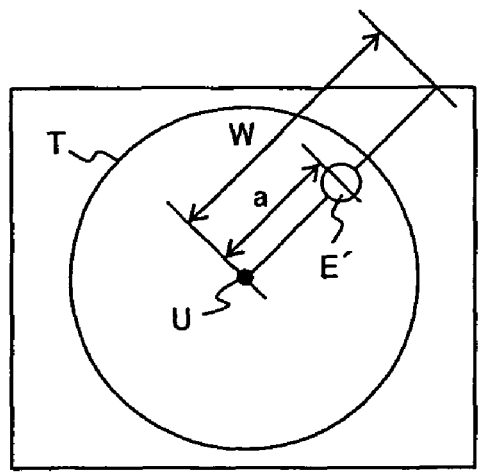

Therefore, as shown in FIG. 9(a), the distance calculating unit 32b allows for the tilt (here, $\theta$) of the axis of the spotlight projected by the light projecting unit 20, and calculates distance l between the image obtaining camera 10 and the object T.

In this instance, as the tilt of the axis of the spotlight projected by the light projecting unit 20 from the optical axis of the image obtaining camera 10, it is sufficient to allow for the direction of a straight line connecting the image obtaining camera 10 and the light projecting unit 20 (light source 21), and the tilt in the direction of the normal to the straight line can be ignored. As a supplementary explanation, the tilt in the direction of the normal relates to how far the movement straight line of the spotlight is apart from an assumed line on the image.

As shown in FIG. 9(a), assuming that the object T is away from the image obtaining apparatus 1 by distance l and is placed at a position orthogonal to the optical axis of the image obtaining camera 10, the image obtaining range of the image obtaining camera 10 is given as w, and the position on the object T at which a spotlight is projected is given as d+x. In addition, the distance from the center of the image obtaining camera 10 to the center of the light projecting unit 20 (here, light source 21) is given as d, and the deviation of irradiation position, which is the amount of displacement caused by the deviation of the optical axis $\theta_1$, is given as x. On the other hand, as shown in FIG. 9(b), in an image obtained by the image obtaining camera 10, the spot position of the bright area E' is observed at a position which is away from the center U of the image by distance a. The image range in the direction in which the spotlight moves (corresponding to straight lines Da' through Dd' in FIG. 6) is given as W.

Here, under the condition shown in FIG. 9(a) and FIG. 9(b), a proportional relation ship indicated by the following formula (1) holds.

$$\frac{a}{W} = \frac{d+x}{w} \quad (1)$$

Here, the image obtaining range w can be expressed by the half value $\alpha_1$ of angle of view of the camera and distance l, and the deviation x due to the optical axis deviation $\theta$ can be expressed by distance l and the optical axis deviation $\theta_1$. Thus, the above formula (1) is replaced by the following formula (2):

$$\frac{a}{W} = \frac{d + l\tan\theta_1}{l\tan\alpha_1} \quad (2)$$

Then, the following formula (3) is obtained by solving the equation (2) for distance l:

$$l = \frac{d}{\frac{a}{W}\tan\alpha_1 - \tan\theta_1} \quad (3)$$

The distance calculating unit 32b calculates distance l based on the thus obtained formula (3).

The optical axis deviation $\theta_1$ in the above formula (3) is an unknown value, and thus the distance calculating unit 32b obtains the optical axis deviation $\theta_1$ based on the following formulae (4) through (7) at the time of initial setting of the image obtaining apparatus 1.

That is, the following formula (4) is obtained by solving the above equation (3) for the optical axis deviation $\theta_1$:

$$\tan\theta_1 = \frac{a}{W}\tan\alpha_1 - \frac{d}{l} \quad (4)$$

In order to solve the optical axis deviation $\theta_1$ on the basis of the formula (4), the distance calculating unit 32b calculates (calibrates) $\tan\theta_1$ by measuring spot position a at known distance l at the time of initial setting of the image obtaining apparatus 1. Note that this processing is performed for each of the light projecting units 20a through 20d.

Here, normally, $\tan\theta_1$ can be calculated by using only one known distance l.

However, it is sometimes difficult, due to e.g., limitation in application of the lens of the image obtaining camera 10, to accurately obtain a distance origin point (that is, a starting point on the lens of the image obtaining apparatus 1 for obtaining the known distance l) for determining the known distance l. In such a case, the distance calculating unit 32b calculates $\tan\theta_1$ by using two calibration measuring points.

That is, $\tan\theta_1$ is calculated based on the distance (difference) between the two calibration measuring points, not simply based on distance l from the lens of the image obtaining camera 10 to the object.

More specifically, the object is placed at each of the two calibration measuring points whose distance difference $\Delta$ are precisely obtained beforehand, and image obtaining camera 10 obtains an image of the object. The distance calculating unit 32b calculates the distance to the object from the obtained image, thereby calibrating the optical axis deviation $\theta_1$.

More precisely, the distance calculating unit 32b measures spot position $a_1'$ in the image obtained at calibration measuring point $a_1$ whose distance L is known, and further, the distance calculating unit 32 measures spot position $a_2'$ in the image obtained at calibration measuring point $a_2$ which is away from the calibration measuring point $a_1$ by distance $\Delta$. These spot positions $a_1'$ and $a_2'$ are substituted into the above formula (4), whereby the following formula (5) is obtained $$\frac{a_1'}{W}\tan\alpha_1 - \frac{d}{L} = \frac{a_2'}{W}\tan\alpha_1 - \frac{d}{L+\Delta} \quad (5)$$

Then, the following formula (6) is obtained by solving the above equation (5) for distance L:

$$L = \frac{-\Delta + \sqrt{\Delta^2 - 4k}}{2} \quad (6)$$

Here, k in the above formula (6) is expressed by the following formula (7):

$$k = \frac{\Delta \cdot d}{(a_1' - a_2')\frac{\tan\alpha_1}{W}} \quad (7)$$

The distance calculating unit 32b thereby calculates distance L, and also calculates (calibrates) $\tan\theta_1$ by substituting the above formula (6) into the above formula (4).

In this manner, the distance calculating unit 32b extracts a spot position from the images of the object which are obtained by the image obtaining camera 10 at two known distances at the time of initial setting, and completes the above formula (3) for calculating the distance to the object based on the extracted spot position. As a result, it becomes possible for the distance calculating unit 32b to calculate the distance to the object, allowing for the deviation of the axis of the spotlight projected by the light projecting unit 20 from the optical axis of the image obtaining camera 10.

As a result, in the image obtaining apparatus 1, the axis of a spotlight projected by the light projecting unit 20 need not be precisely parallel to the optical axis of the image obtaining camera 10, so that highly accurate assembly is no longer necessary, thereby reducing manufacturing cost.

The object's information detecting unit 32c of FIG. 2 detects the tilt of the object from the optical axis of the image obtaining camera 10 and attitude information of the object relative to the axis of the image obtaining camera 10.

In other words, the object's information detecting unit 32c detects the tilt of the object in one direction (two-dimensional information) based on the two distances calculated by the distance calculating unit 32b, and it also detects the attitude (tilts in two directions; three-dimensional information) of the object based on three or four distances calculated by the distance calculating unit 32b.

Figure 10:
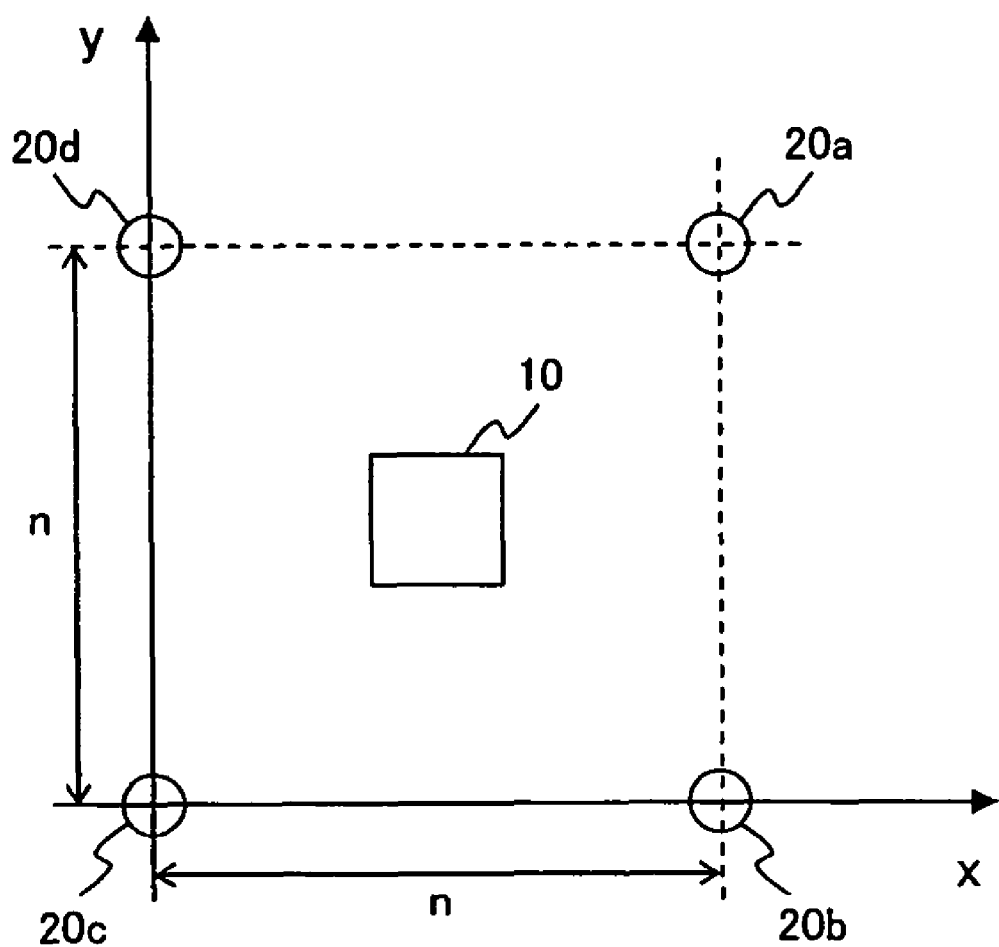
FIG. 10 is an x-y plan view in which the positions of light projecting units of the image obtaining apparatus of the present embodiment are shown.
Figure 11:
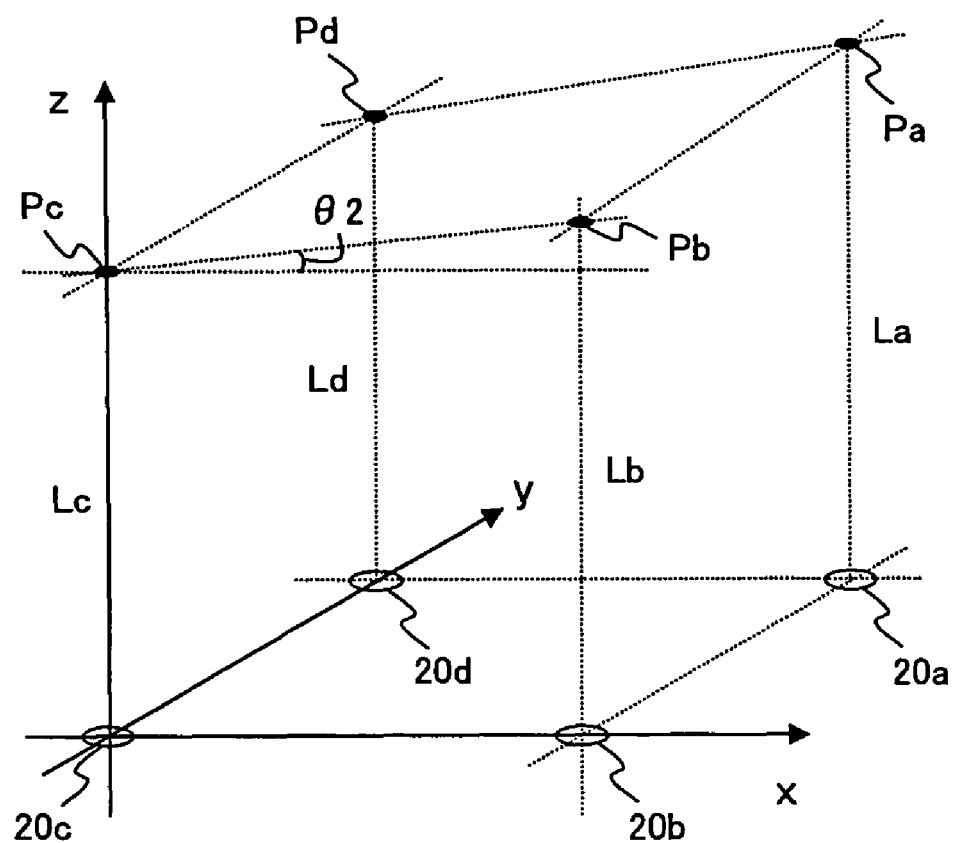
FIG. 11 is a diagram for describing correspondences between the positions of the light-projecting units of the image obtaining apparatus of the present embodiment and spot positions on the object image obtained by the image obtaining camera.

Here, referring to FIG. 10 and FIG. 11, a description will made of a method for detecting a tilt and an attitude of an object by the object's information detecting unit 32c.

As shown in FIG. 10, positions of the light projecting units 20a through 20d in the image obtaining apparatus 1 are expressed on an x-y plane, with the light projecting unit 20c as the origin. The light projecting unit 20b has coordinate (n, 0) on the x-axis; the light projecting unit 20d has coordinate (0, n) on the y-axis; the light projecting unit 20a has coordinate (n, n).

FIG. 11 shows the result of projecting spotlights by these light projecting units 20 on the object (that is, spot positions Pa through Pd extracted by the spot position extracting unit 32a in the image). In this instance, as shown in FIG. 11, spot position Pa corresponds to the light projecting unit 20a; spot position Pb corresponds to the light projecting unit 10b; spot position Pc corresponds to the light projecting unit 20c; spot position Pd corresponds to the light projecting unit 20d.

Here, assuming that the distances to spot positions Pa through Pd calculated by the distance calculating unit 32b are La through Ld, respectively, the three-dimensional coordinates (x, y, z) of spot positions Pa through Pd are as follows: spot position Pa has coordinate (n, n, La); spot position Pb has coordinate (n, 0, Lb); spot position Pc has coordinate (0, 0, Lc); spot position Pd has coordinate (0, n, Ld).

The surface of the object which faces the image obtaining camera 10 is a plane or can be regarded as a plane, the image obtaining surface can be expressed by the following formula (8):

$$ax+by+cz+d=0 \qquad (8)$$

where a, b, c, and d are coefficients.

Thus, the object's information detecting unit 32c solve the formula (8) by substituting the coordinates of spot positions Pa through Pd in the above formula (8), thereby obtaining the coefficients a, b, c, and d. The object's information detecting unit 32c determines the plane formed by spot positions Pa through Pd, and obtains the tilt and attitude of the object from thus-obtained plane.

Here, three spot positions are enough to determine the plane. Thus, since four or more spot positions are redundant, the object's information detecting unit 32c obtains an approximate plane by the least-square method. Alternatively, the plane is divided into triangles, and obtained as a composite plane.

In an example shown in FIG. 11, the object's information detecting unit 32c can divide the plane with a straight line passing through spot positions Pb and Pd, and can obtain two planes: one passing through spot positions Pb, Pc, and Pd; the other passing through spot positions Pa, Pb, and Pd.

When the object's information detecting unit 32c detects in what degree the object is tilted relative to the y-axis, that is, when the object's information detecting unit 32c detects angle $\theta_2$ in FIG. 11, it obtains the following formula (9) based on the above formula (8) to detect the tilt $\theta_2$.

$$\tan \theta_2 = a/c \qquad (9)$$

Here, the object's information detecting unit 32c can obtain $\theta_2$ from the following formula (10), without calculating the plane based on the formula (8)

$$\tan \theta_2 = (Lb-Lc)/n \qquad (10)$$

Further, the object's information detecting unit 32c performs the above-mentioned processing for obtaining the tilt for three dimensions, that is, tilts from x-axis, y-axis, and z-axis are obtained, to detect attitude information of the object.

Figure 13:
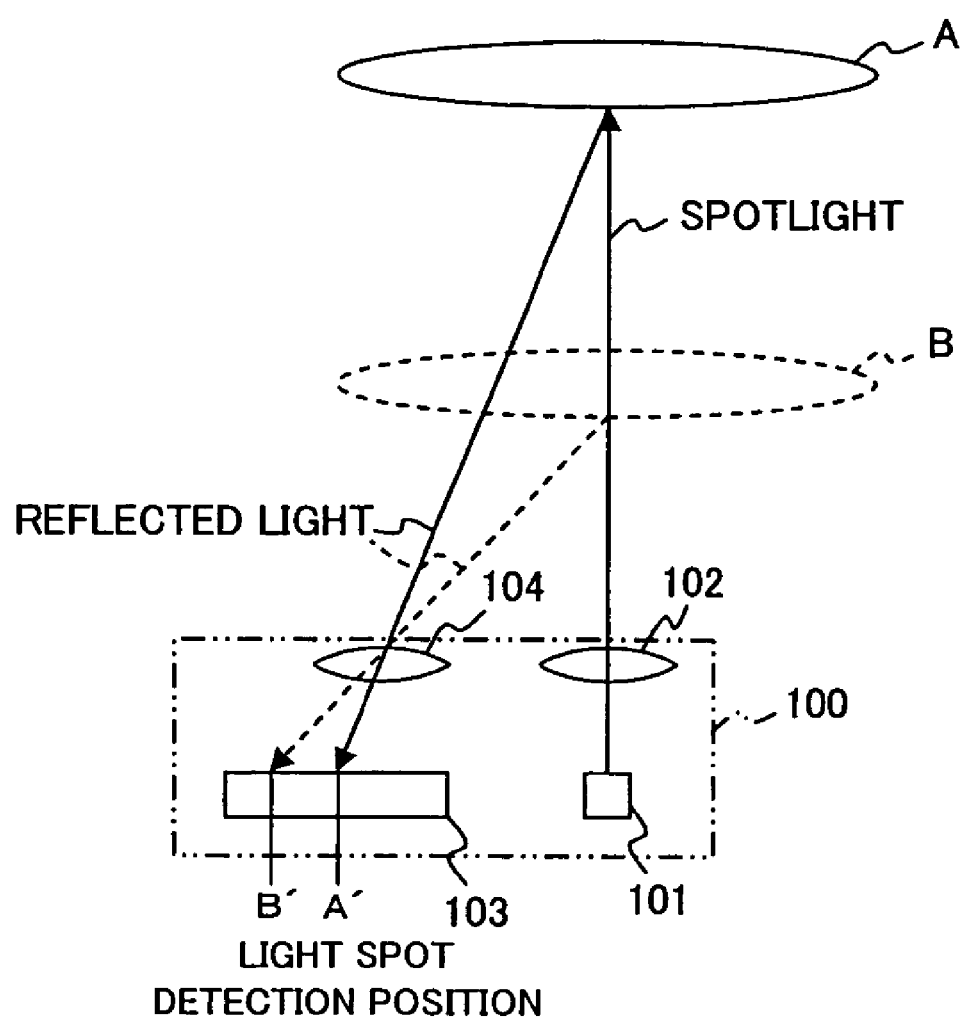
FIG. 13 is a diagram for describing a construction of a conventional image obtaining apparatus.
Figure 14A:
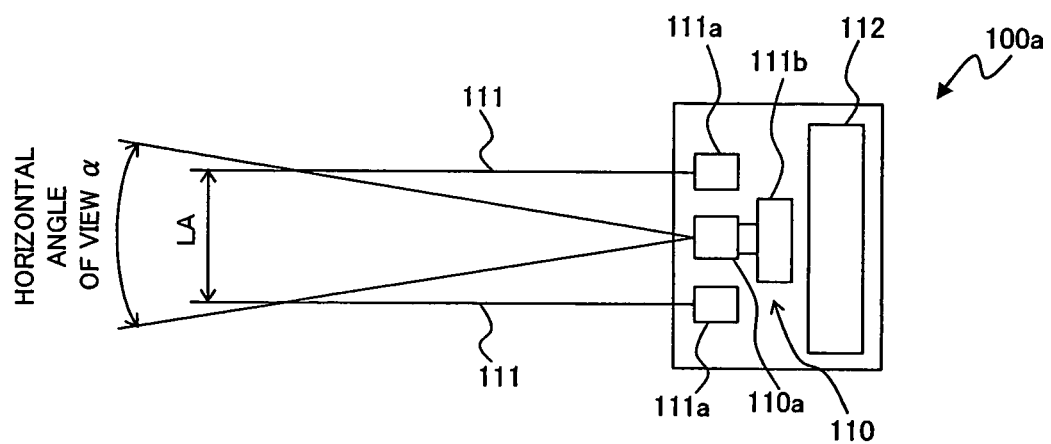
FIG. 14($a$) and FIG. 14($b$) are diagrams for describing a construction of the conventional image obtaining apparatus.
Figure 14B:
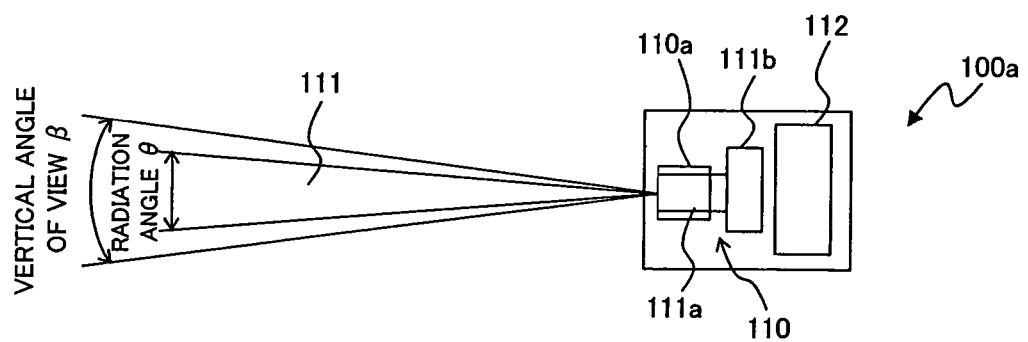
Figure 15A:
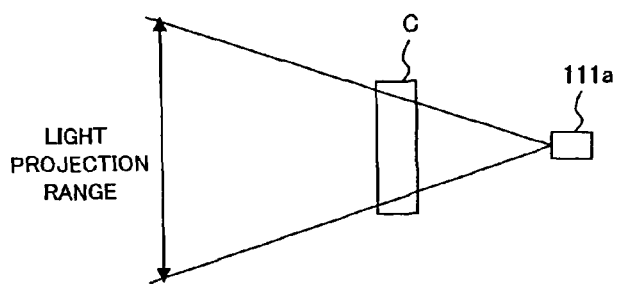
FIG. 15(a) is a diagram showing an example of an image obtaining state of the object.
Figure 15B:
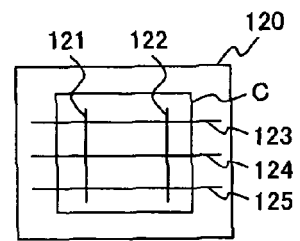
FIG. 15(b) is a diagram showing a picture image obtained by a CCD camera under a state which is illustrated in FIG. 15(a)
Figure 16A:
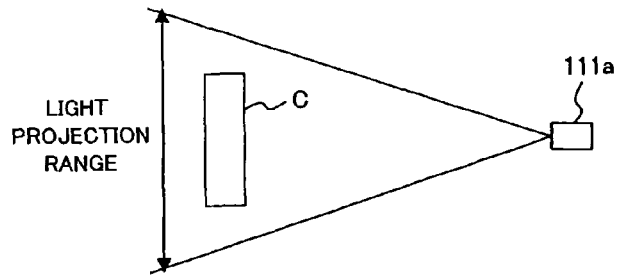
FIG. 16(a) and FIG. 16(b) are diagrams for describing a method for calculating the distance between the conventional image obtaining apparatus of FIG. 14(a) and FIG. 14(b) and an object.
Figure 16B:
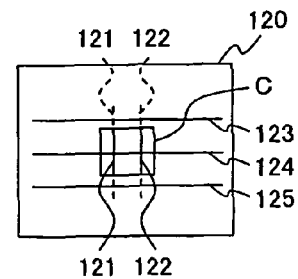

As described so far, according to the image obtaining apparatus 1, on the basis of the positions (spot positions) of the spotlights projected by the light projecting unit 20 on the image of the object obtained by the image obtaining camera 10, the detecting unit 32 detects (i) the distance between the image obtaining camera 10 and the object and (ii) the tilt of the object from the optical axis of the image obtaining camera 10, or (i) the distance between the image obtaining camera 10 and the object and (ii) attitude information of the object relative to the optical axis of the image obtaining camera 10. Hence, it is not necessary that a sensor (position sensor, etc.) for detecting the distance between the image obtaining camera 10 and the object be provided as in the above-described conventional image obtaining apparatus (see FIG. 13), so that the whole apparatus is downsized and cost is reduced.

Here, when adding functions of detecting the distance, tilt, attitude of an object to an existing apparatus with an image obtaining camera 10, only a light projecting unit 20 should be added as hardware, so that downsizing and reduction in cost are realized.

In addition, in the image obtaining apparatus 1, the detecting unit 32 detects the above distance based on bright areas lighted by spotlights projected by the light projecting unit 20 on the object in the image obtained by the image obtaining camera 10. Thus, the spotlights projected by the light projecting unit 20 need not be those with high accuracy like laser light (that is, parallel light with a small spot diameter). Therefore, in the image obtaining apparatus 1, as the light source 21 of the light projecting unit 20, an inexpensive LED can be used, thereby realizing reduced cost.

Further, in the image obtaining apparatus 1, spotlights projected by the light projecting units 20 are parallel or approximately parallel to the optical axis of the image obtaining camera 10. Thus, as already described with reference to FIG. 5(a) and FIG. 5(b), as long as the object moves along a direction parallel to the optical axis of the image obtaining camera 10, the positions of bright areas lighted by spotlights on the object are the same among the images obtained by the image obtaining camera 10. Accordingly, in the image obtaining apparatus 1, it is possible for the detecting unit 32 to reliably detect the distance and the tilt, or the distance and the attitude, of the object, irrespective of the distance of the object from the image obtaining camera 10.

(2) Others

The present invention should by no means be limited to the above-illustrated embodiment, but various changes or modifications may be suggested without departing from the gist of the invention.

For example, in the above-described embodiment, the image obtaining apparatus 1 has four light projecting units 20 (light projecting units 20a through 20d). The present invention should by no means be limited to this, and when the detecting unit 32 detects the tilt of the object, at least two light projecting units are necessary. When the detecting unit 32 detects the attitude information of the object, at least three light projecting units 20 are necessary.

Further, in the above-described embodiment, the control unit 31 of the operation unit 30 controls the image obtaining camera 10 and the light projecting unit 20 so that image obtaining by the image obtaining camera 10 is performed in synchronism with light projection by the light projecting unit 20. Thus, only images in which spotlights are projected by the light projecting unit 20 are obtained by the image obtaining camera 10. However, the present invention should by no means be limited to this, and for example, the control unit 31 can control the image obtaining camera 10 and the light projecting unit 20 so that a first picture image, in which spotlights from the light projecting unit 20 are not projected, and a second picture image, in which spotlights from the light projecting unit 20 are projected, are obtained.

In this case, the spot position extracting unit 32a of the detecting unit 32 identifies bright areas lighted by spotlights from the light projecting unit 20 based on a difference image between the first image and the second image, that is, an image obtained by removing bright areas in the first image from the second image, and then extracts spot positions from the identified bright areas.

As a result, in addition to the effects of the above-described embodiment, the following advantages are realized. That is, even if bright areas other than the bright areas lighted by spotlights from the light projecting unit 20 exist in the image obtained by the image obtaining camera 10, such bright areas are deleted by removing the bright areas in the first picture image from the second picture image, so that only bright areas lighted by the spotlights are reliably identified.

Further, the control unit 31 can control the image obtaining camera 10 and the light projecting unit 20 so that the image obtaining camera 10 obtains multiple picture images in which the brightness of spotlights differs thereamong. The image obtaining camera 10 is controlled to obtain picture images while the light projecting unit 20 changes the brightness of spotlights.

In this case, the spot position extracting unit 32a of the detecting unit 32 identifies the areas whose brightness varies among the multiple images obtained by the image obtaining camera 10 as bright areas lighted by the spotlights projected by the light projecting unit 20, and extracts spot positions from the identified bright areas.

With this arrangement, in addition to the effects of the above-described embodiment, the following advantages are realized. For example, even in cases where light from background of the object is so strong in a picture image obtained by the image obtaining camera 10 that it is difficult to identify bright areas lighted by spotlights projected by the light projecting unit 20, it is still possible to reliably identify only the bright areas lighted by the spotlights, by identifying the bright areas whose brightness varies among the multiple picture images.

Further, the light projecting unit 20 can project spotlights according to a light-projecting pattern (brightness) at the time the image obtaining camera 10 obtains picture images of the object. The spot position extracting unit 32a identifies bright areas whose brightness varies in the same pattern as that of the light-projecting pattern of the light projecting unit 20 as bright areas lighted by spotlights from the light projecting unit 20. This makes it possible to further reliably identify the bright areas lighted by spotlights projected by the light projecting unit 20.

Furthermore, in the above embodiment, the distance calculating unit 32b of the detecting unit 32 calculates the distance between the image obtaining camera 10 and the object based on formulae. The present invention should by no means be limited to this, and for example, the operation unit 30 can have a table indicating correspondences between spot positions (that is, the distance from the center of the picture image to spot positions) of spotlights in picture images obtained by the image obtaining camera 10 and the distances between the image obtaining camera 10 and the object. The distance calculating unit 32b obtains the distance between the image obtaining camera 10 and the object based on this table.

In this case, such a table is held in a ROM (Read Only Memory) or a RAM (Random Access Memory) of the operation unit 30.

In this case, also, like in the above-described embodiment, the distance calculating unit 32b corrects the table based on a known distance at initial setting of the image obtaining apparatus 1.

That is, at initial setting, the distance calculating unit 32b corrects the table based on spot positions that are extracted by the spot position extracting unit 32a from images of the object obtained by the image obtaining camera 10 at one or multiple known distances and on such known distances. This makes it possible to correct the deviation of the light projecting unit 20 from the optical axis of the image obtaining camera 10, as with the above-described embodiment, so that highly precise assembly is not required. In addition, correcting a table as described above in a mechanism in which distances are detected based on the table, makes it possible to correct the slight placement deviation for each image obtaining apparatus 1 caused by their manufacturing process.

In addition, since the distance calculating unit 32b detects the distance to the object based on the table, the necessity of above-described calculation in the above embodiment is eliminated. Thus, even a powerless CPU is usable in processing, thereby contributing to reduction of the cost of the present image obtaining apparatus 1. Moreover, the image obtaining apparatus 1 is applicable to integrated equipment.

Here, in cases where it is sufficient to recognize whether or not the object is positioned within a specified distance, spot positions in the image at the specified distance are determined beforehand. If the positions of spotlights projected by the light projecting units 20 are closer to the reference point (e.g., the center point) than the spot positions determined beforehand (that is, if the positions of the spotlights projected by the light projecting units 20 are positioned between the reference point of the image and the spot positions having been set beforehand), the detecting unit 32 decides that the object is placed within a specified distance.

Further, the control unit 31 can control the image obtaining camera 10 and the light projecting unit 20 so that images in which spotlights are projected by the light projecting unit 20 and images in which spotlights are not projected by the light projecting unit 20 are obtained alternately. This makes it possible to obtain the object's information, such as the tilt and the attitude of the object, while picture images of the object are obtained at the same time as if motion pictures were taken. For example, it becomes possible to acknowledge the object's information in time series while obtaining images of the object which is moving.

Furthermore, in the image obtaining apparatus 1, in other cases than those in which an object does not exist within the image obtaining range of the image obtaining camera 10, image obtaining by the image obtaining camera 10 can be temporarily halted, so that circuitry (for example, the operation unit 30) can be paused when image obtaining is unnecessary. This reduces power consumption. More precisely, for example, the image obtaining camera 10 obtains picture images at specified intervals, and only when an object is found in an image, light projection by the light projecting unit 20 and the processing by the operation unit 30 (in particular, the detecting unit 32) are performed.

Figure 12:
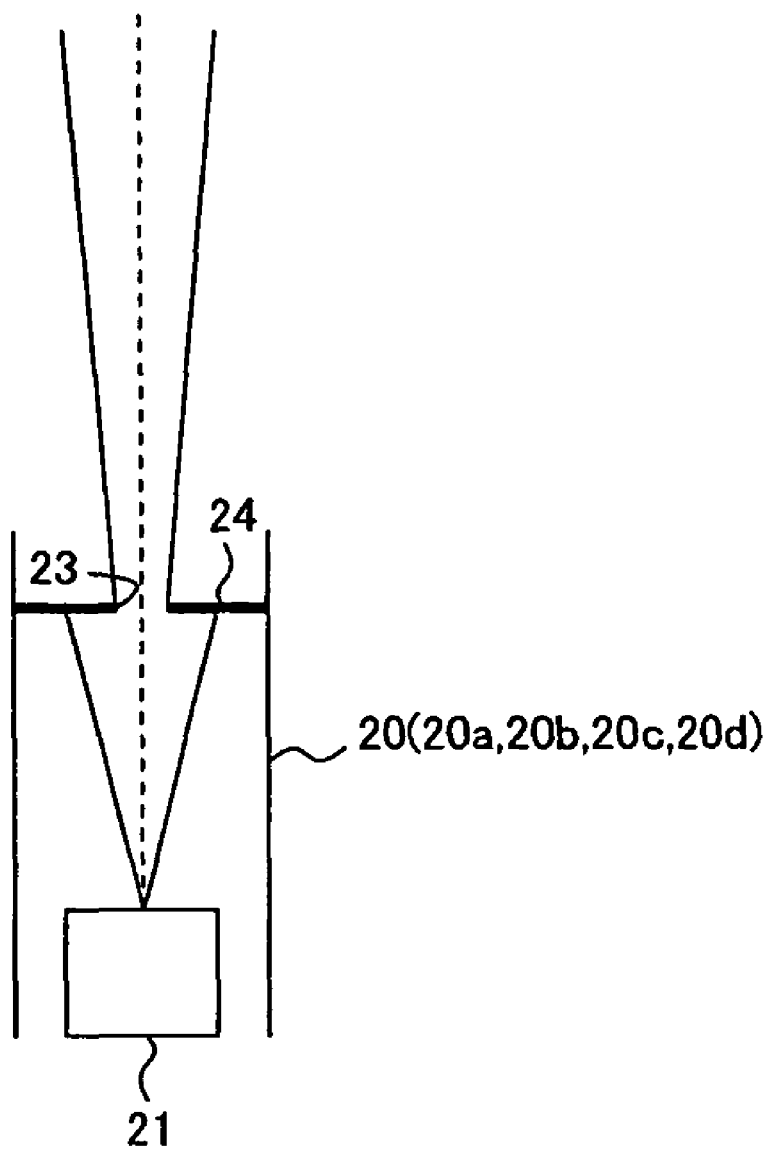
FIG. 12 is a diagram for describing a construction of a light projecting unit of an image obtaining apparatus according to a modified example of the present invention.

In the above-described embodiment, the light projecting unit 20 includes the lens 22 and the adjusting unit 24, and the present invention should by no means be limited to this. As already described, in the image obtaining apparatus 1, a spotlight projected by the light projecting units 20 need not be a highly precise spotlight such as a laser. Thus, as shown in FIG. 12, only adjusting unit 24 can be provided without the lens 22 being provided. Contrarily, only the lens 22 can be provided without the adjusting unit 24 being provided. This arrangement realizes similar effects and benefits to those of the above embodiment, thereby realizing further reduction in cost.

Further, in the above embodiment, each light projecting unit 20 has one light source 21 which projects one spotlight. The present invention should by no means be limited to this, and for example, the adjusting unit 24 is provided with multiple apertures, so that the light projecting unit 20 has one light source 21 for projecting multiple spotlights.

What is claimed is:

1. An image obtaining apparatus, comprising:
   an image obtaining camera which obtains an image of an object;
   a light projecting unit which projects each spotlight parallel or approximately parallel to an optical axis of said image obtaining camera onto the object; and
   a detecting unit which calculates the distance between said image obtaining camera and the object by calculating the distance between the position of the spotlight, projected by said light projecting unit, on the object image obtained by said image obtaining camera and a center point of the image obtained by said image obtaining camera based on the object image including the spotlight projected by said light projecting unit.

2. An image obtaining apparatus as set forth in claim 1, wherein said light projecting unit projects three or more spotlights, and
   wherein said detecting unit detects attitude information of the object relative to the optical axis of said image obtaining camera based on the positions of the three or more spotlights, projected by said light projecting unit, on the object image obtained by said image obtaining camera.

3. An image obtaining apparatus as set forth in claim 2, wherein said light projecting unit projects the three or more spotlights in such a manner that in the obtained image, directions from a reference point of the image to the positions of the three or more spotlights are different from one another.

4. An image obtaining apparatus as set forth in claim 2, wherein said light projecting unit projects the three or more spotlights in such a manner that in the obtained image, each area irradiated with a spotlight from said light projecting unit, which area is recognizable to said detecting unit, does not interfere with its adjacent area irradiated with another spotlight.

5. An image obtaining apparatus as set forth in claim 1, wherein said light projecting unit has a light source which is an LED (Light Projecting Diode).

6. An image obtaining apparatus as set forth in claim 1, wherein said light projecting unit includes an adjusting unit having an aperture for reducing the spot diameter of light emitted by said light source.

7. An image obtaining apparatus as set forth in claim 1, wherein said each spotlight projected by said light projecting unit is infrared light.

8. An image obtaining apparatus as set forth in claim 1, wherein said detecting unit extracts a spot position from an area irradiated with said each spotlight on the object image, and performs the above detection based on the distance between the extracted spot position and the center point of the obtained image.

9. An image obtaining apparatus as set forth in claim 8 wherein said detecting unit extracts the center point or the barycenter point of the irradiated area as the spot position.

10. An image obtaining apparatus as set forth in claim 8, wherein said detecting unit searches for the irradiated area, starting from the center point of the obtained image, toward a specified direction, and extracts the spot position from an area that is initially found out as an irradiated area.

11. An image obtaining apparatus as set forth in claim 1, further comprising:
    a control unit which controls said image obtaining camera and said light projecting unit so that image obtaining by said image obtaining camera is performed in synchronization with spotlight projection by said light projecting unit.

12. An image obtaining apparatus as set forth in claim 1, further comprising: a control unit which controls image obtaining by said image obtaining camera and spotlight projection by said light projecting unit,
    said control unit controlling said image obtaining camera to obtain a first image of the object under a condition where no spotlight from said light projecting unit is projected thereon, and to obtain a second image of the object under a condition where said each spotlight from said light projecting unit is projected thereon, and
    said detecting unit performing the above detection based on an image obtained by removing bright areas in the first image from the second image.

13. An image obtaining apparatus as set forth in claim 1, further comprising: a control unit which controls image obtaining by said image obtaining camera and spotlight projection by said light projecting unit,
    said control unit controlling said image obtaining camera to obtain a plurality of images of the object with the brightness of said each spotlight from said light projecting unit being changed, and
    said detecting unit identifying portions whose brightness is changed among the plurality of images as the position of each said spotlight.

14. An image obtaining apparatus as set forth in claim 1, wherein said detecting unit detects the distance between the image obtaining camera and the object, based on a calculation formula indicating correspondences between the position of said each spotlight in an image obtained by image obtaining camera and the distance between said image obtaining camera and the object.

15. An image obtaining apparatus as set forth in claim 14, wherein said detecting unit extracts, at the time of initial setting, the spot position from the object image which is obtained by the image obtaining camera at a known distance, and calibrates the calculation formula based on the extracted spot position and on the known distance.

16. An image obtaining apparatus as set forth in claim 1, further comprising a table indicating correspondences between the position of each said spotlight in an image obtained by said image obtaining camera and the distance between said image obtaining camera and the object, said detecting unit detecting the distance between said image obtaining camera and the object based on the table.

17. An image obtaining apparatus as set forth in claim 16, wherein said detecting unit extracts, at the time of initial setting, the spot position from an object image which is obtained by the image obtaining camera at a known distance, and corrects the table based on the extracted spot position and on the known distance.

18. An image obtaining apparatus, comprising:

an image obtaining camera which obtains an image of an object;

a light projecting unit which projects a plurality of spotlights parallel or approximately parallel to an optical axis of said image obtaining camera onto the object; and a detecting unit which calculates tilt of the object relative to the optical axis of said image obtaining camera by respectively calculating the distance between the position of each of the plurality of spotlights on the object image obtained by said image obtaining camera and a center point of the image obtained by said image obtaining camera based on the object image including the plurality of spotlights projected by said light projecting unit.

19. An image obtaining apparatus, comprising:

an image obtaining camera which obtains an image of an object;

a light projecting unit which projects a plurality of spotlights parallel or approximately parallel to an optical axis of said image obtaining camera onto the object; and a detecting unit which calculates (i) a distance between said image obtaining camera and the object and (ii) tilt of the object relative to the optical axis of said image obtaining camera by respectively calculating the distance between the position of each of the plurality of spotlights, projected by said light projecting unit, on the object image obtained by said image obtaining camera and a center point of the image obtained by said image obtaining camera based on the object image including the plurality of spotlights projected by said light projecting unit.

* * * * *